United States Patent
Shibata et al.

(10) Patent No.: US 10,017,145 B2
(45) Date of Patent: Jul. 10, 2018

(54) SIDE AIRBAG APPARATUS

(71) Applicant: TOYODA GOSEI CO., LTD., Kiyosu-shi, Aichi-ken (JP)

(72) Inventors: Masami Shibata, Kiyosu (JP); Koji Shibayama, Kiyosu (JP); Yuki Noiri, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/432,970

(22) Filed: Feb. 15, 2017

(65) Prior Publication Data

US 2017/0240133 A1 Aug. 24, 2017

(30) Foreign Application Priority Data

Feb. 22, 2016 (JP) ................................. 2016-030802

(51) Int. Cl.
| | |
|---|---|
| *B60R 21/207* | (2006.01) |
| *B60R 21/231* | (2011.01) |
| *B60R 21/217* | (2011.01) |
| *B60R 21/2338* | (2011.01) |
| *B60R 21/235* | (2006.01) |
| *B60R 21/237* | (2006.01) |

(52) U.S. Cl.
CPC ...... *B60R 21/23138* (2013.01); *B60R 21/207* (2013.01); *B60R 21/2171* (2013.01); *B60R 21/235* (2013.01); *B60R 21/237* (2013.01); *B60R 21/2338* (2013.01); *B60R 2021/2078* (2013.01); *B60R 2021/23146* (2013.01); *B60R 2021/23153* (2013.01); *B60R 2021/23382* (2013.01); *B60R 2021/23509* (2013.01)

(58) Field of Classification Search
CPC ............ B60R 21/23138; B60R 21/207; B60R 21/2338
USPC ................................. 280/730.2, 743.1, 743.2
See application file for complete search history.

(56) References Cited

U.S. PATENT DOCUMENTS

| | | | | |
|---|---|---|---|---|
| 3,874,693 A | * | 4/1975 | Patzelt | .................. B60R 21/233 280/731 |
| 5,044,663 A | * | 9/1991 | Seizert | .................. B60R 21/233 264/515 |

(Continued)

FOREIGN PATENT DOCUMENTS

| | | | | | |
|---|---|---|---|---|---|
| JP | 2002144996 A | * | 5/2002 | .......... | B60R 21/233 |
| JP | 2004-217184 A | | 8/2004 | | |
| JP | 2007-510581 A | | 4/2007 | | |

*Primary Examiner* — Faye M Fleming
(74) *Attorney, Agent, or Firm* — Posz Law Group, PLC

(57) ABSTRACT

A side airbag apparatus includes an inflator, an airbag body that is configured to be deployed and inflated by inflation gas supplied from the inflator, and an inflated-dimension limiter arranged inside the airbag body. The inflated-dimension limiter is joined to the airbag body by a front joint portion provided at the front end of the inflated-dimension limiter. The inflated-dimension limiter is also joined, by a rear joint portion provided at the rear end of the inflated-dimension limiter, to a portion of the airbag body that is behind a section of the airbag body to which the inflated-dimension limiter is joined by the front joint portion. The dimension between the uppermost end and the lowermost end of the front joint portion is set to be different from the dimension between the uppermost end and the lowermost end of the rear joint portion.

9 Claims, 6 Drawing Sheets

(56) References Cited

U.S. PATENT DOCUMENTS

| | | | | |
|---|---|---|---|---|
| 5,205,584 A * | 4/1993 | Honda | ............... | B60R 21/217 280/743.2 |
| 5,350,188 A * | 9/1994 | Sato | ............... | B60R 21/233 280/739 |
| 5,607,183 A * | 3/1997 | Nishimura | ............... | B60R 21/233 280/743.1 |
| 6,361,072 B1 * | 3/2002 | Barnes | ............... | B60R 21/233 280/728.1 |
| 6,981,719 B2 * | 1/2006 | Igawa | ............... | B60R 21/233 280/743.1 |
| 7,726,685 B2 * | 6/2010 | Abe | ............... | B60R 21/2338 280/736 |
| 2005/0236823 A1 * | 10/2005 | Schuetz | ............... | B60R 21/233 280/743.2 |
| 2006/0232049 A1 * | 10/2006 | Abe | ............... | B60R 21/233 280/729 |
| 2007/0267856 A1 | 11/2007 | Schedler | | |
| 2009/0051144 A1 * | 2/2009 | Kai | ............... | B60R 21/233 280/728.1 |

\* cited by examiner

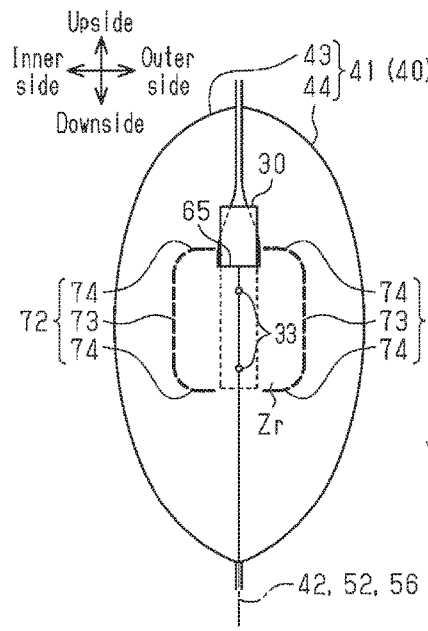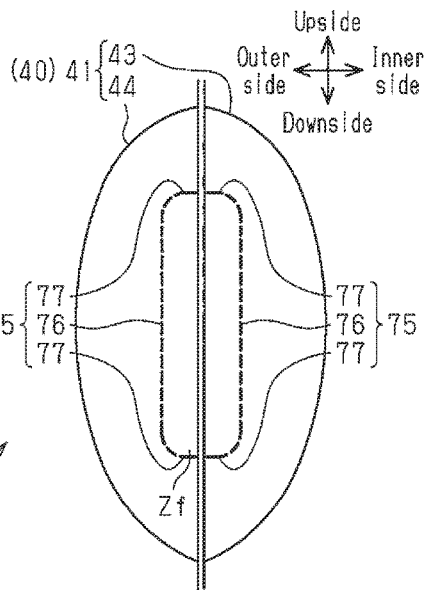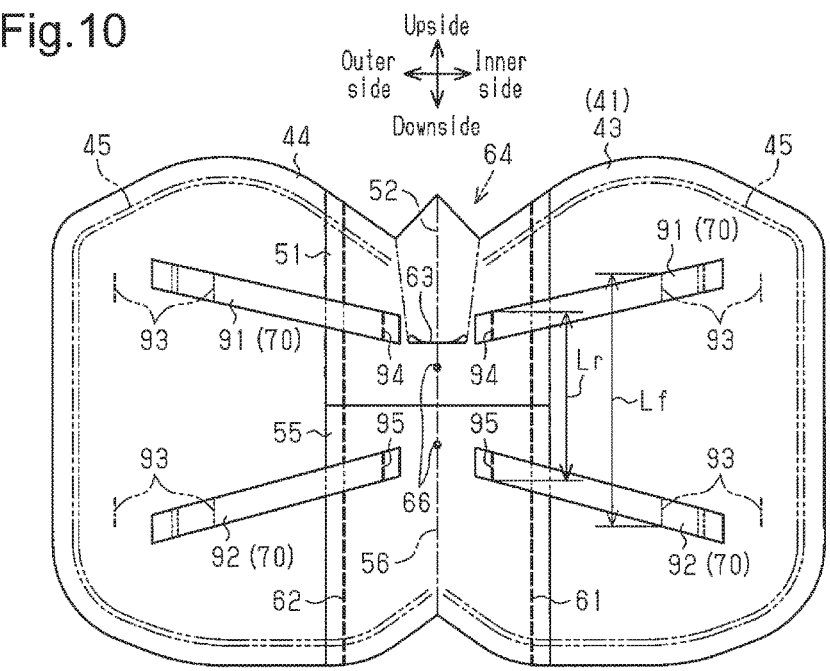

SIDE AIRBAG APPARATUS

BACKGROUND OF THE INVENTION

The present invention relates to a side airbag apparatus that protects an occupant seated in a vehicle seat from an impact by deploying and inflating an airbag on the side of the occupant when the impact is applied to the vehicle from the side of the vehicle seat.

A side airbag apparatus having an airbag and an inflator is effective as an apparatus that protects an occupant seated in an automobile seat when an impact is applied to the seat from a side, for example, due to a side collision. The outer shape of the airbag is formed by an airbag body. The inflator is arranged at the rear end of the airbag body and fixed to the automobile.

In the above described side airbag apparatus, when an impact is applied from the side to a body side portion of the automobile, for example, to a side door, the inflator supplies inflation gas to the airbag body. The airbag body is deployed and inflated between the upper body of the occupant and the body side portion, which bulges into the interior of the automobile. The upper body of the occupant is restrained by the airbag body, and the impact from the side, which is transmitted to the upper body through the body side portion, is alleviated, so that the upper body is protected from the impact.

As one form of the above described side airbag apparatus, for example, Japanese National Phase Laid-Open Patent Publication No. 2007-510581 discloses a side airbag apparatus that includes an inflated-dimension limiter (tether) bridging opposite inner surfaces of the airbag body. The inflated-dimension limiter is shaped as a sheet that extends in the front-rear direction and has a constant width in the up-down direction. The inflated-dimension limiter is joined to the front end of the airbag body by a front joint portion provided at the front end and is joined to the rear end of the airbag body by a rear joint portion provided at the rear end.

When the airbag body is inflated, the inflated-dimension limiter (tether) is tensioned in the front-rear direction. The tensioned inflated-dimension limiter limits the inflated dimension of the airbag body in the front-rear direction, so that the airbag body acts to inflate in the automobile width direction. In the section of the airbag body where the inflated-dimension limiter is provided, the inflated dimension in the front-rear direction is small compared to the case in which the inflated-dimension limiter is not provided, and the inflated dimension in the automobile width direction is increased. This improves the performance of restraining the occupant.

In the side airbag apparatus disclosed in the above-mentioned publication, the up-down dimension of the front joint portion and the up-down dimension of the rear joint portion are the same. The inflated dimension in the automobile width direction of the airbag body increases mostly in the section between the rear joint portion and the front joint portion. Therefore, there is room for improvement in reducing the inflated dimension in the front-rear direction of the airbag body and increasing the inflated dimension in the automobile width direction, thereby improving the performance of restraining the occupant. This is not limited to side airbag apparatuses for automobiles but applies to any side airbag apparatuses for other types of vehicles.

SUMMARY OF THE INVENTION

Accordingly, it is an objective of the present invention to provide a side airbag apparatus capable of increasing the inflated dimension of an airbag body in the width direction of a vehicle seat in a larger area of the airbag body, thereby improving the performance of restraining the occupant.

To achieve the foregoing objectives and in accordance with one aspect of the present invention, a side airbag apparatus is provided that includes an inflator, an airbag body, and an inflated-dimension limiter. The airbag body is configured to be deployed and inflated by inflation gas supplied from the inflator beside an upper body of an occupant seated in a vehicle seat arranged in a vehicle. The inflated-dimension limiter is arranged inside the airbag body. The inflated-dimension limiter is joined to the airbag body by a front joint portion provided at a front end of the inflated-dimension limiter. The inflated-dimension limiter is joined, by a rear joint portion provided at a rear end of the inflated-dimension limiter, to a portion of the airbag body that is behind a section of the airbag body to which the inflated-dimension limiter is joined by the front joint portion. The side airbag apparatus is configured to cause the inflated-dimension limiter to be tensioned as the airbag body is inflated to limit an inflated dimension of the airbag body in a front-rear direction, thereby inflating the airbag body by a greater amount in a width direction of the vehicle seat than in a case in which the inflated-dimension limiter is not provided. A dimension between an uppermost end and a lowermost end of the front joint portion is set to be different from a dimension between an uppermost end and a lowermost end of the rear joint portion.

BRIEF DESCRIPTION OF THE DRAWINGS

FIG. 9A is a rear view showing the airbag module when the airbag body is deployed and inflated according to the embodiment.

FIG. 9B is a front view showing the airbag module when the airbag body is deployed and inflated according to the embodiment.

FIG. 10 is an explanatory diagram of an inflated-dimension limiter according to a modification, illustrating the positional relationship between a flatly spread airbag body, to which reinforcing fabric sheets are attached, and limiter pieces attached to the airbag body and the reinforcing fabric sheets.

DETAILED DESCRIPTION OF THE PREFERRED EMBODIMENTS

A side airbag apparatus for an automobile rear seat according to one embodiment of the present invention will now be described with reference to FIGS. 1 to 9B.

In the following description, the direction in which the automobile advances (moves forward) will be referred to as the front, and the reverse direction of the automobile will be referred to as the rear. The height direction of the automobile will be referred to as the up-down direction of the automobile. The left-right direction (the width direction) of the automobile is defined with reference to the state in which the automobile is viewed from the rear. It is now assumed that an occupant having a size equivalent to a crash test dummy is seated on the automobile seat.

Figure 2:
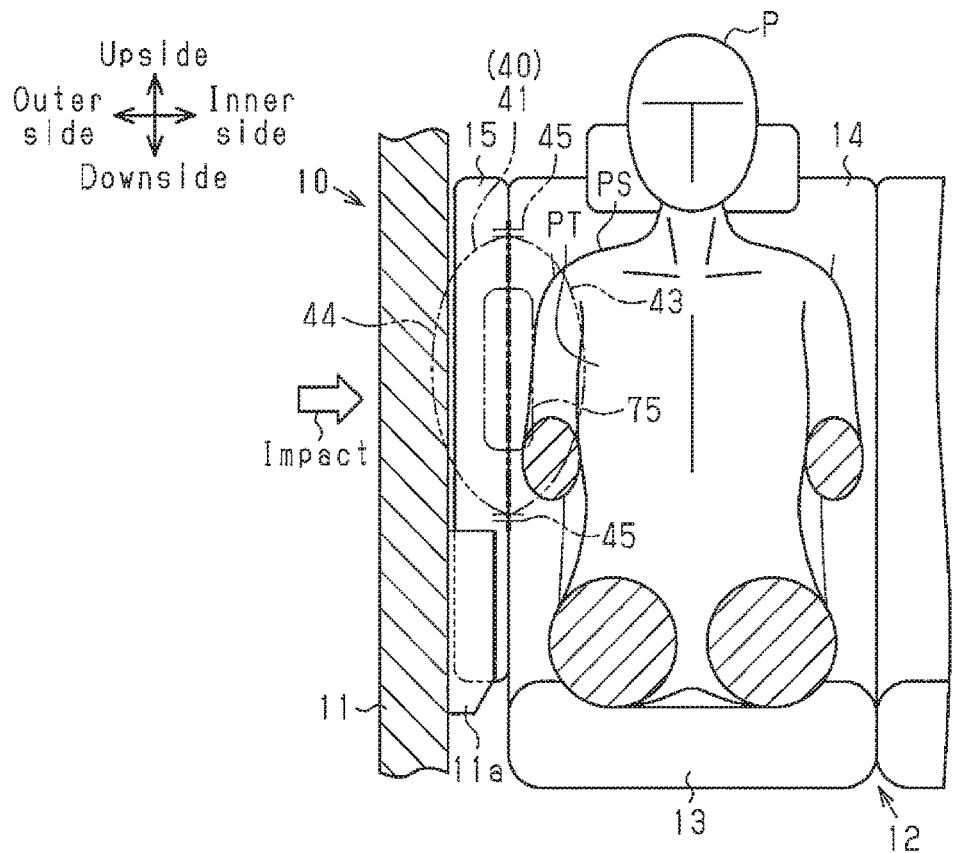
FIG. 2 is a cross-sectional front view of the positional relationship of the automobile seat, the garnish, the airbag, the occupant, and the body side portion according to the embodiment.

As shown in FIG. 2, a vehicle, which is an automobile 10 in the present embodiment, has a body side portion 11 on a side. A front seat and a rear seat are arranged in the front-rear direction in the vicinity of the inner side of the body side portion 11. The front seat and the rear seat are vehicle seats, which are automobile seats 12 in the present embodiment. FIG. 2 illustrates an automobile seat 12 that constitutes the rear seat. In this description, the body side portion 11 is mainly constituted by a door and a pillar. The part of the body side portion 11 corresponding to the rear seat includes a rear part of the side door (rear door), a C-pillar, a front part of a wheel well, and the rear quarter. The reference numeral 11a in FIG. 2 represents an armrest that protrudes into the passenger compartment from the body side portion 11.

The automobile seat 12 includes a seat cushion 13 and a seat back 14, which extends diagonally upward and rearward from the rear end of the seat cushion 13. The automobile seat 12 is arranged in the passenger compartment such that the seat back 14 faces the front side of the automobile. The width direction of the thus arranged automobile seat 12 agrees with the direction of the automobile width.

A garnish 15 is arranged between the body side portion 11 and the seat back 14. The garnish 15 has an elongated shape to be longer in the up-down direction than in the automobile width direction. The garnish 15 is fixed to the body of the automobile 10 by a fastening member.

Figure 1:
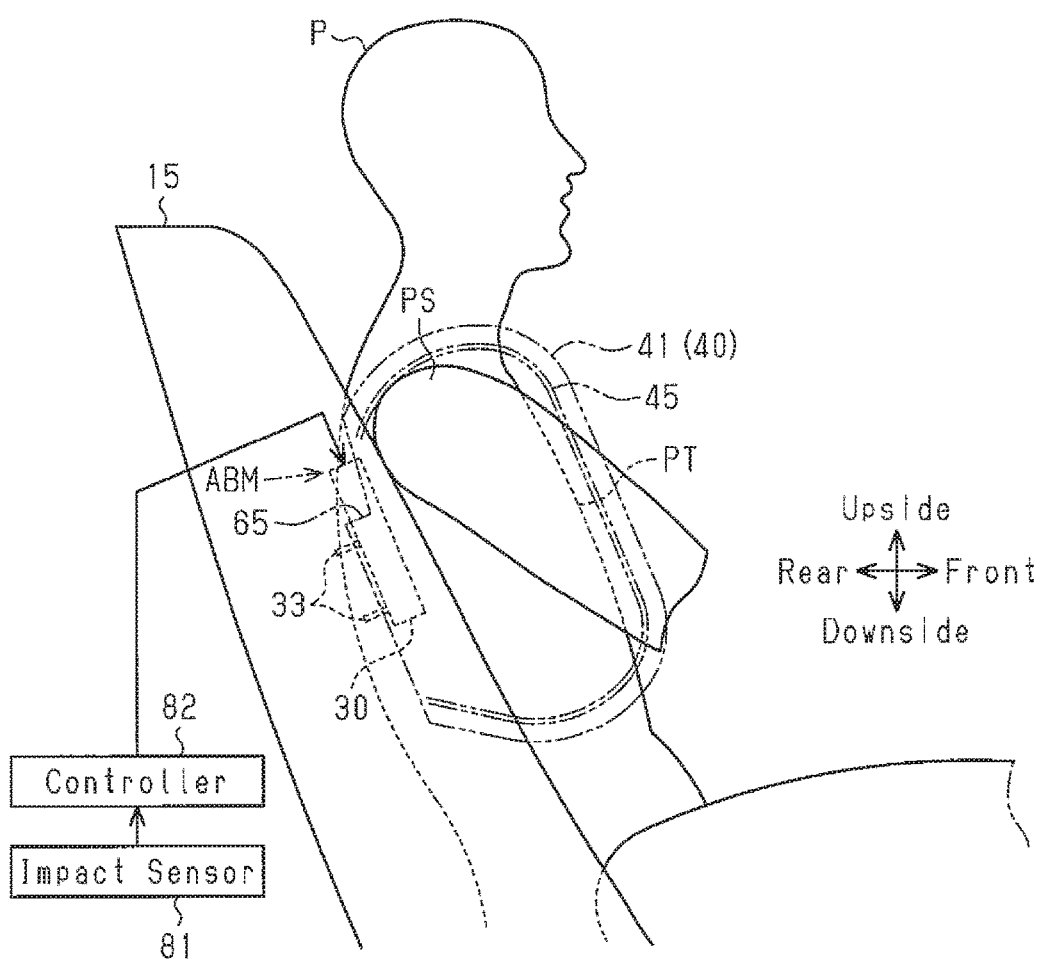
FIG. 1 is a partial side view of a side airbag apparatus for an automobile rear seat according to one embodiment, illustrating, together with an occupant, the apparatus installed in a garnish.
Figure 3:
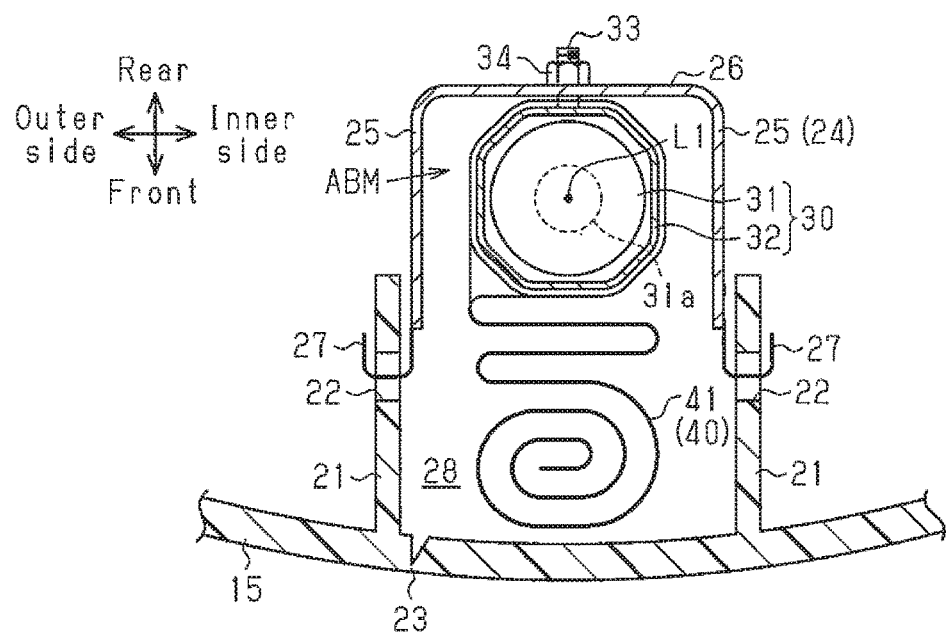
FIG. 3 is a cross-sectional plan view showing a state in which the airbag module is installed in the garnish according to the embodiment.

As shown in FIGS. 1 and 3, an airbag module ABM, which is a main part of the side airbag apparatus, is attached to the garnish 15. The airbag module ABM includes as its main components a gas generator 30 and an airbag 40. The outer shape of the airbag 40 is formed by an airbag body 41. Each of these components will now be described.

In the present embodiment, the up-down direction and the front-rear direction of the components of the airbag module ABM are defined with reference to the seat back 14 of the automobile seat 12. The direction in which the seat back 14 extends upward is referred to as the up-down direction of the airbag module ABM and the like, and the thickness direction of the seat back 14 is referred to as the front-rear direction of the airbag module ABM and the like. As described above, the seat back 14 is slightly inclined rearward. Thus, in a strict sense, the up-down direction of the airbag module ABM and the like does not agree with the up-down direction of the automobile 10 (vertical direction), but is slightly inclined relative to the vertical direction. Likewise, the front-rear direction of the airbag module ABM and the like does not agree with the front-rear direction of the automobile 10 (the horizontal direction), but is slightly inclined relative to the horizontal direction.

<Gas Generator 30>

Figure 5:
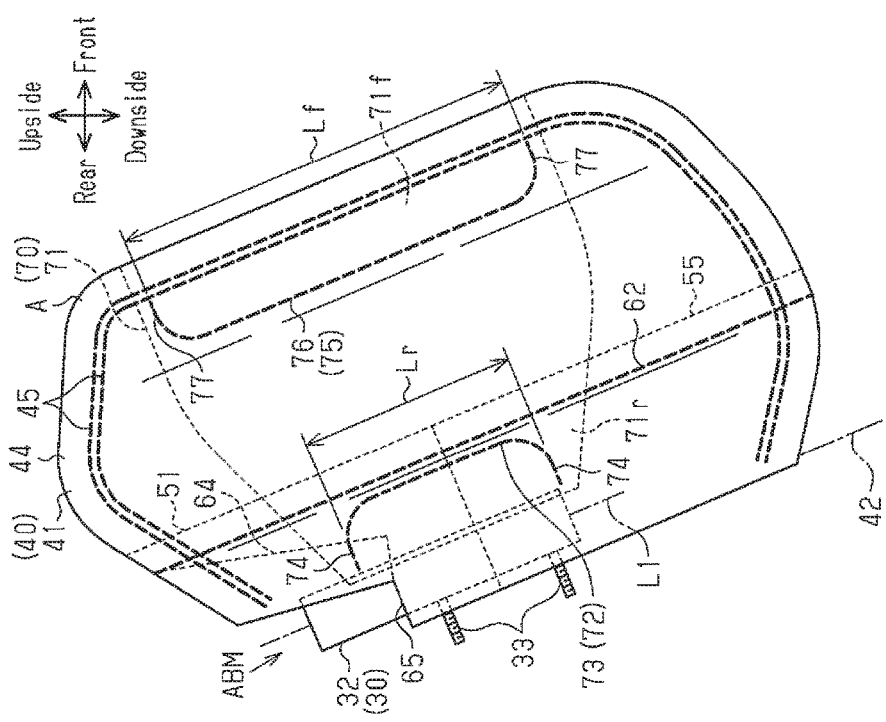
FIG. 5 is a cross-sectional side view showing the internal structure of the airbag module shown in FIG. 4.

As shown in FIGS. 3 and 5, the gas generator 30 includes an elongated inflator 31 and a retainer 32, which surrounds the inflator 31. A pyrotechnic type inflator is employed as the inflator 31. The inflator 31 is substantially columnar and accommodates a gas generating agent (not shown), which generates inflation gas. The inflator 31 has a gas outlet 31a at the lower end. A harness (not shown) for delivering activation signals to the inflator 31 is connected to the upper end of the inflator 31.

In place of the pyrotechnic type inflator 31 using a gas generating agent, it is possible to use a hybrid type inflator, which discharges inflation gas by breaking a partition of a high-pressure gas cylinder filled with high-pressure gas with low explosive.

The retainer 32 functions as a diffuser for controlling the direction of discharged inflation gas and also functions to fasten the inflator 31, together with the airbag 40, to the automobile 10. Most of the retainer 32 is formed by bending a plate such as a metal plate into a substantially cylindrical shape. The retainer 32 has a window (not shown) at a position facing the gas outlet 31a. The inflation gas discharged from the gas outlet 31a is supplied to the airbag body 41 through the window, the lower opening of the retainer 32, and the like. Two bolts 33 are fixed to the retainer 32. The bolts 33 serve as securing members for attaching the retainer 32 to the body of the automobile 10. The gas generator 30 may be formed by integrating the inflator 31 and the retainer 32.

<Airbag Body 41>

Figure 4:
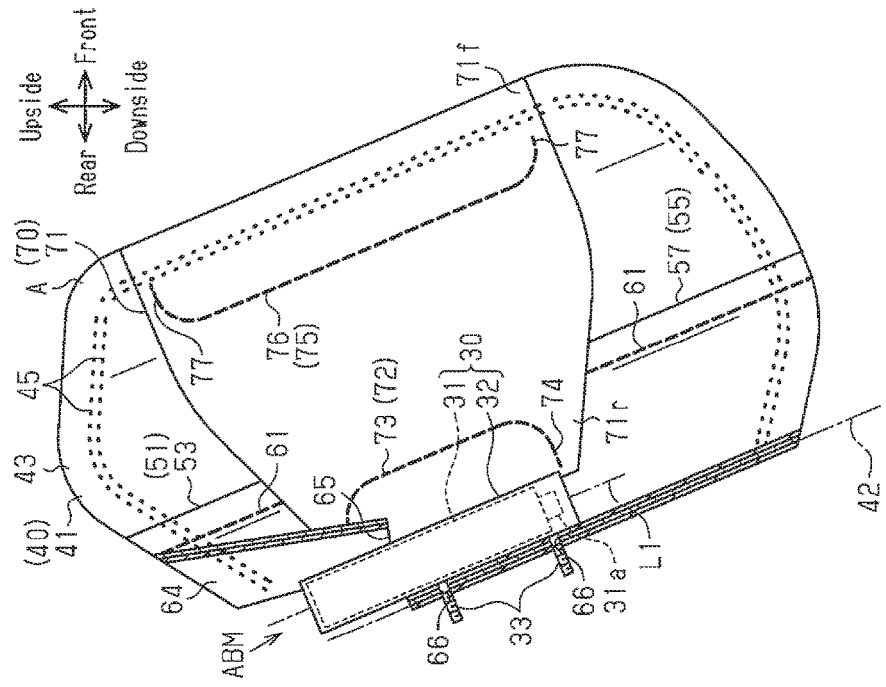
FIG. 4 is a side view of the airbag module, in which the airbag body is in an uninflated-and-spread state, according to the embodiment.
Figure 6:
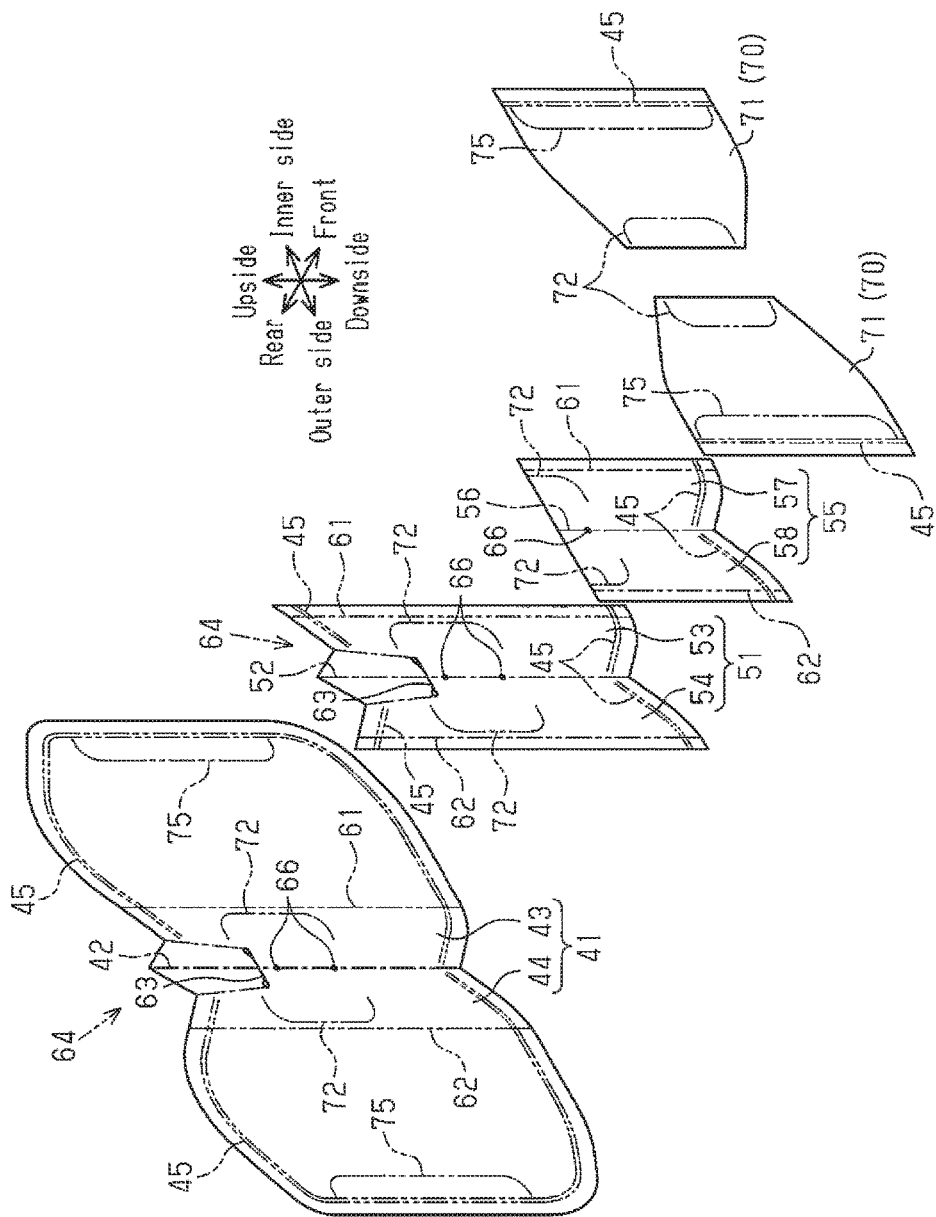
FIG. 6 is an exploded perspective view showing a flatly spread state of the components of the airbag according to the embodiment.

FIG. 4 shows the airbag module ABM with the airbag body 41 in an uninflated-and-spread state without being filled with inflation gas. FIG. 5 shows the airbag module ABM in which the airbag body 41 of FIG. 4 is cut at the center portion in the automobile width direction to show the internal structure of the airbag module ABM. FIG. 6 shows the components of the airbag 40 including the airbag body 41 in a state flatly spread along the width of the automobile.

As shown in FIGS. 4 to 6, the airbag body 41 is formed of a single fabric piece. The fabric piece is also referred to as a base fabric or a fabric panel. The airbag body 41 has a folding line 42 extending in the up-down direction at the center in the automobile width direction. The airbag body 41 is formed by folding forward the single fabric piece along the folding line 42 to be superposed on itself in the automobile width direction, and joining the superposed parts to form a bag-like structure. To distinguish the two sections on both sides of the folding line 42, the section located on the inner side will be referred to as a main body fabric portion 43, and the section located on the outer side will be referred to as a main body fabric portion 44.

In the present embodiment, the fabric piece is folded in half such that the folding line 42 is located at the rear end of the airbag body 41 as shown in FIGS. 4 and 5. However, the fabric piece may be folded in half such that the folding line 42 is located at another end of the airbag body 41, such as the front end, the upper end, or the lower end. The airbag body 41 may also be formed of two fabric pieces divided along the folding line 42. At least one of the main body fabric portions 43, 44 may be formed by two or more fabric pieces.

As shown in FIGS. 1 and 2, the shapes and sizes of the main body fabric portions 43, 44 are set such that the airbag body 41 occupies the region corresponding to the region of the upper body of the occupant P ranging from the shoulder region PS to the thorax region PT when the airbag body 41 is deployed and inflated between the automobile seat 12 and the body side portion 11. The front upper ends A of the main body fabric portions 43, 44, which are folded in half, are curved to bulge forward and upward (see FIGS. 4 and 5) and configured to be located in the vicinity of the side of the shoulder region PS when the airbag body 41 is deployed and inflated.

The main body fabric portions 43, 44 are preferably formed of a material having high strength and flexibility that can be folded easily. The material may be, for example, woven cloth formed of polyester threads or polyamide threads.

As shown in FIGS. 4 and 5, the main body fabric portions 43, 44 are joined by a peripheral joint portion 45 provided at the periphery of the main body fabric portions 43, 44. In the first embodiment, the peripheral joint portion 45 is formed by sewing parts of the peripheral portions of the fabric portions 43, 44 except for the rear end, more specifically, the part in the vicinity of the folding line 42. Sewing is also performed on other joint portions, which will be discussed below. Other joint portions include vertical joint portions 61, 62, rear joint portions 72, rear end joint portions 94, 95, front joint portions 75, and front end joint portions 93.

Two different types of broken lines represent sewing portions in FIGS. 4 and 5. The same applies to FIG. 10, which illustrates a modification. The first broken line includes thick line segments of a certain length arranged intermittently and represents sewing threads as viewed from the side (refer to the peripheral joint portion 45 in FIG. 4). The second broken line includes dots arranged at predetermined intervals and represents the cross section of the sewing threads on a plane through the sewn portions (refer to the peripheral joint portion 45 in FIG. 5).

The peripheral joint portion 45 may be formed by a method other than sewing using the sewing threads, but may be formed by, for example, using an adhesive. Such modification is applicable to any of the above described joint portions.

Two kinds of reinforcing fabric sheets 51, 55 and a pair of inflated-dimension limiters 70 are provided in the airbag body 41.

<Reinforcing Fabric Sheets 51, 55>

Figure 7:
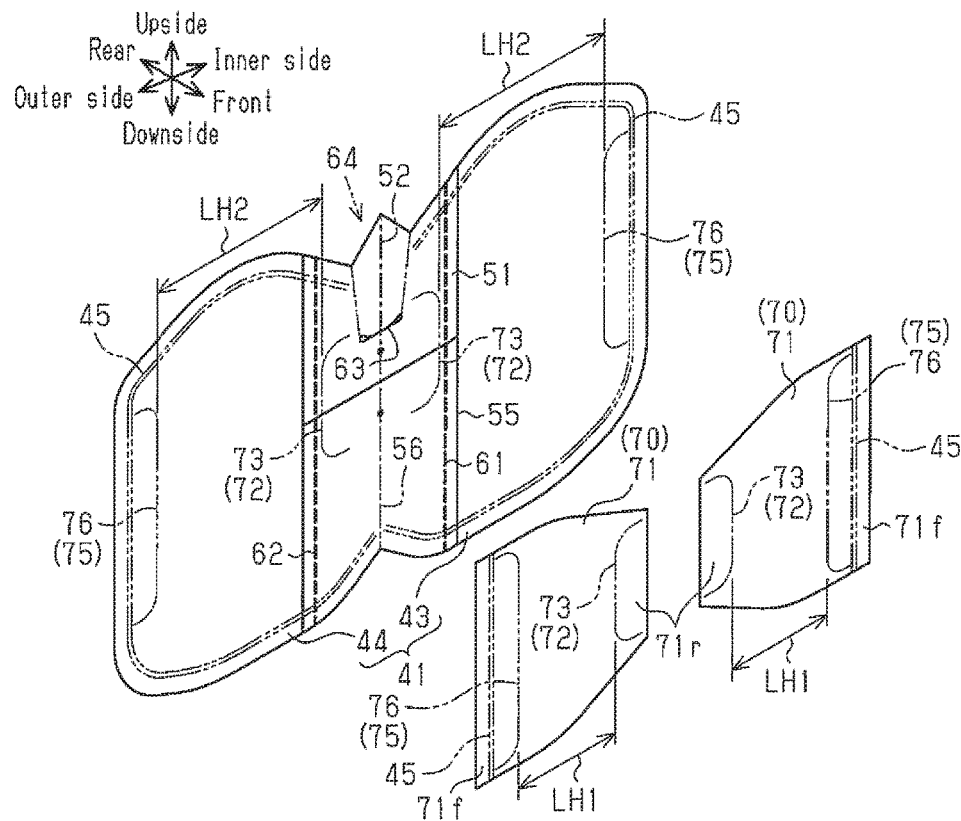
FIG. 7 is an exploded perspective view showing a flatly spread state of the airbag body, reinforcing fabric sheets, and a pair of limiter pieces joined to the airbag body and the reinforcing fabric sheets.

The reinforcing fabric sheets 51, 55 are formed of the same material as the main body fabric portions 43, 44. As shown in FIGS. 6 and 7, the reinforcing fabric sheet 51 has the same shape as the central portion in the automobile width direction of the airbag body 41 in a flatly spread state. That is, the reinforcing fabric sheet 51 is elongated in the up-down direction. The reinforcing fabric sheet 51 has a folding line 52 extending in the up-down direction at the center in the automobile width direction. To distinguish two sections of the reinforcing fabric sheet 51 on the opposite sides of the folding line 52, the section on the inner side will be referred to as a reinforcing fabric portion 53, and the section on the outer side will be referred to as a reinforcing fabric portion 54. The reinforcing fabric sheet 51 is superposed on the central portion of the airbag body 41 in the automobile width direction with the folding line 52 aligned with the folding line 42 of the airbag body 41.

The reinforcing fabric sheet 55 is formed into the same shape as the substantially lower half of the reinforcing fabric sheet 51. The reinforcing fabric sheet 55 has a folding line 56 extending in the up-down direction at the center in the automobile width direction. To distinguish two sections of the reinforcing fabric sheet 55 on the opposite sides of the folding line 56, the section on the inner side will be referred to as a reinforcing fabric portion 57, and the section on the outer side will be referred to as a reinforcing fabric portion 58. The reinforcing fabric sheet 55 is superposed on the substantially lower half of the reinforcing fabric sheet 51 with the folding line 56 aligned with the folding line 52 of the reinforcing fabric sheet 51.

The reinforcing fabric portions 53, 57 on the inner side are joined to the main body fabric portion 43 on the inner side by the vertical joint portion 61 on the inner side, which extends in the up-down direction. Also, the reinforcing fabric portions 54, 58 on the outer side are joined to the main body fabric portion 44 on the outer side by the vertical joint portion 62 on the outer side, which extends in the up-down direction.

The reinforcing fabric sheets 51, 55 are folded forward in half along the folding lines 42, 52, 56 together with the airbag body 41 and superposed onto each other in the automobile width direction. The upper end of the reinforcing fabric sheet 51 is joined to the upper ends of the main body fabric portions 43, 44 of the airbag body 41 by part of the peripheral joint portion 45. Further, the lower ends of the reinforcing fabric sheets 51, 55 are joined to the lower ends of the main body fabric portions 43, 44 by part of the peripheral joint portion 45.

The airbag body 41 and the reinforcing fabric sheet 51 each have a slit 63 in an upper part at the rear end. The slits 63 extend in a direction orthogonal to the folding lines 42, 52. The parts of the airbag body 41 and the reinforcing fabric sheet 51 that are above the slits 63 constitute an inward folding portion 64, which is folded into, or tucked into, the remaining parts of the airbag body 41 and the reinforcing fabric sheet 51 (see FIG. 5). The upper end of the inward folding portion 64 is joined to the remaining parts of the airbag body 41 and the reinforcing fabric sheet 51 by part of the peripheral joint portion 45. When the inward folding portion 64 is formed, the slits 63 are opened to form an insertion port 65 for the gas generator 30 (see FIG. 9A).

The airbag body 41 and the reinforcing fabric sheet 51 have bolt holes 66 for receiving the two bolts 33 on the folding lines 42, 52. The bolt holes 66 are spaced apart in the up-down direction. Another bolt hole 66 is provided on the folding line 56 of the reinforcing fabric sheet 55. The bolt hole 66 on the folding line 56 receives the lower one of the two bolts 33 of the gas generator 30.

As shown in FIGS. 4 and 5, most of the gas generator 30, which is arranged to extend in the up-down direction, except for the upper part, is inserted into the rear end of the airbag body 41 through the insertion port 65. The bolts 33 of the gas generator 30 are inserted into the bolt holes 66, so that the gas generator 30 is positioned and secured to the airbag body 41 and the reinforcing fabric sheets 51, 55.

The airbag body 41, the reinforcing fabric sheets 51, 55, and the gas generator 30 are fixed to the body of the automobile 10 by the bolts 33. The details will be discussed below.

<Inflated-Dimension Limiters 70>

Figure 8:
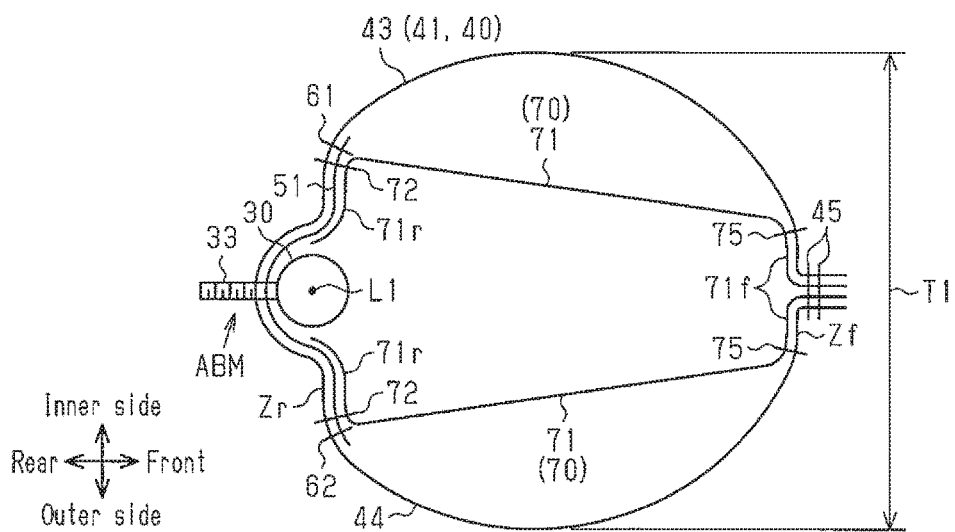
FIG. 8 is a schematic cross-sectional plan view showing the internal structure of the airbag module when the airbag body is deployed and inflated according to the embodiment.

As shown in FIGS. 7 and 8, each inflated-dimension limiter 70 is configured to limit the inflated dimension of the airbag body 41 in the front-rear direction, thereby increasing the inflated dimension T1 in the automobile width direction. Each inflated-dimension limiter is constituted by a single limiter piece 71. Two inflated-dimension limiters 70, or two limiter pieces 71, are arranged side by side in the automobile width direction in the airbag body 41. The limiter pieces 71 have the same shape and are made of the same material as that of the main body fabric portions 43, 44. Each limiter piece 71 bridges two sections of one of the main body fabric portions 43, 44, which are located on the opposite sides.

When the airbag body 41 is in the uninflated-and-spread state, the front section of each limiter piece 71 is formed to have a substantially constant dimension in the up-down direction over the entire length in the front-rear direction as shown in FIGS. 4 and 5. In contrast, the rear section of each limiter piece 71 is formed to have a dimension in the up-down direction that decreases toward the rear end. The dimension in the up-down direction of each limiter piece 71 is minimized at the rear end. The dimension in the up-down direction of each limiter piece 71 at the rear end 71r is set to be smaller than the dimension in the up-down direction of the reinforcing fabric sheet 51. The rear section of each limiter piece 71 is located at the center in the up-down direction of the reinforcing fabric sheet 51.

The rear end 71r of each limiter piece 71 is joined to the airbag body 41 and the reinforcing fabric sheets 51, 55 in the vicinity of the bolt holes 66 by the rear joint portion 72. More specifically, each rear end 71r is joined to the airbag body 41 and the reinforcing fabric sheets 51, 55 by the rear joint portion 72 that is provided at sections of the airbag body 41 and the reinforcing fabric sheets 51, 55, which are in the vicinity of the section of the airbag body 41 fixed to the automobile 10 (the bolt holes 66). That is, each inflated-dimension limiter 70 is joined to the airbag body 41 and the reinforcing fabric sheets 51, 55 by the rear joint portion 72, which is provided at the rear end of the inflated-dimension limiter 70. As shown in FIG. 9A, each rear joint portion 72 is constituted by a vertical rear joint portion 73 and a pair of horizontal rear joint portions 74. Each vertical rear joint portion 73 extends in the up-down direction at a position that is separated in the automobile width direction from the folding lines 42, 52, 56 and in the vicinity of the vertical joint portions 61, 62 (see FIG. 4). The horizontal rear joint portions 74 of each rear joint portion 72 extend from the upper and lower ends of the vertical rear joint portion 73 toward the other rear joint portion 72 and the folding lines 42, 52, 56. As shown in FIG. 4, the dimension Lr of the rear joint portion 72 between the uppermost end (the upper horizontal rear joint portion 74) and the lowermost end (the lower horizontal rear joint portion 74) is smaller than the dimension in the up-down direction of the reinforcing fabric sheet 51. In other words, the dimension in the up-down direction of the rear joint portion 72 is smaller than the dimension in the up-down direction of the reinforcing fabric sheet 51.

In contrast, as shown in FIGS. 4 and 5, the front end 71f of each limiter piece 71 is joined to the front part of the corresponding main body fabric portion 43, 44 of the airbag body 41 by the front joint portion 75. That is, each inflated-dimension limiter 70 is joined to the front part of the corresponding one of the main body fabric portions 43, 44 of the airbag body 41 by the front joint portion 75 provided at the front end of the inflated-dimension limiter 70. As shown in FIG. 9B, each front joint portion 75 is constituted by a vertical front joint portion 76 and a pair of horizontal front joint portions 77. Each vertical front joint portion 76 extends in the up-down direction at a position that is separated from the peripheral joint portion 45. The horizontal front joint portions 77 of each front joint portion 75 extend from the upper and lower ends of the vertical front joint portion 76 toward the other front joint portion 75.

As shown in FIGS. 4 and 5, the uppermost end (the upper horizontal front joint portion 77) of the front joint portion 75 is located above the uppermost end (the upper horizontal rear joint portion 74) of the rear joint portion 72 in the direction along the axis L1 of the inflator 31. The uppermost end (the upper horizontal front joint portion 77) of the front joint portion 75 is at the position in the vicinity of each front upper end A of the airbag body 41. This position becomes near the side of the shoulder region PS of the occupant P when the airbag body 41 is deployed and inflated. Also, the lowermost end of the front joint portion 75 (the lower horizontal front joint portion 77) is located below the lowermost end (the lower horizontal rear joint portion 74) of the rear joint portion 72 in the direction along the axis L1. Since the uppermost end (the upper horizontal front joint portion 77) and the lowermost end (the lower horizontal front joint portion 77) of the front joint portion 75 are respectively arranged at the above mentioned positions, the dimension Lf at the front joint portion 75 is greater than the dimension Lr at the rear joint portion 72. In other words, the dimension in the up-down direction of the front joint portion 75 is greater than the dimension in the up-down direction of the rear joint portion 72.

As shown in FIG. 7, the front-rear length LH1 from the vertical rear joint portion 73 of the rear joint portion 72 to the vertical front joint portion 76 of the front joint portion 75 in each limiter piece 71 is shorter than the front-rear length LH2 from the vertical rear joint portion 73 of the rear joint portion 72 to the vertical front joint portion 76 of the front joint portion 75 in each of the main body fabric portions 43, 44 (LH1<LH2). Therefore, the limiter pieces 71 are joined to the main body fabric portions 43, 44 in a state in which the limiter pieces 71 are tensioned and the main body fabric portions 43, 44 are bent (refer to FIGS. 4 and 5).

The airbag module ABM is made into a compact storage form as shown in FIG. 3 by folding the airbag body 41 in the uninflated-and-spread state shown in FIGS. 4 and 5 together with the reinforcing fabric sheets 51, 55 and the limiter pieces 71. This is for arranging the airbag module ABM between the seat back 14 and the body side portion 11 and installing the airbag module ABM in the garnish 15. For example, roll-folding and accordion-folding are suitable as methods for folding the airbag body 41, the reinforcing fabric sheets 51, 55, and the limiter pieces 71. Roll-folding refers to a folding method in which one end of the airbag body 41 is set as a center and the remaining portion is wrapped about the center. Accordion-folding refers to a folding method in which the airbag body 41 is repeatedly folded by a constant width while alternating the folding direction.

The airbag module ABM is installed in the garnish 15 in the following manner. As shown in FIG. 3, the garnish 15 has a pair of support walls 21, each of which has a support hole 22. The support walls 21 extend rearward from positions in the garnish 15 that are spaced apart in the automobile width direction.

In addition, the garnish 15 has a breakable portion (a tear line) 23, which is configured to be broken by the airbag 40, at a position near the boundary with the one of the support walls 21. The breakable portion 23 is thinner than the remaining sections of the garnish 15. Thus, the breakable portion 23 has lower strength than the remaining sections of the garnish 15.

A case 24 is attached to the support walls 21. The case 24 includes a pair of side walls 25 and a rear wall 26 and is fixed to the body of the automobile 10. The side walls 25 are separated from each other in the automobile width direction and extend in the up-down direction and the front-rear direction. The rear wall 26 connects the rear ends of the side walls 25 to each other. The front ends of the side walls 25 are arranged between the support walls 21. Each side wall 25 has a securing section 27 at the front end. Each securing section 27 is inserted in and secured to the support hole 22 of the corresponding support wall 21. Thus, each side wall 25 is engaged with the corresponding support wall 21 via the securing section 27.

The space surrounded by part of the garnish 15, the support walls 21, and the case 24 constitutes a storage portion 28. The storage portion 28 accommodates the airbag module ABM with the folded portion of the airbag body 41 positioned on the front side and the gas generator 30 positioned on the rear side. The bolts 33, which extend from the gas generator 30 and are inserted through the bolt holes 66, are inserted through the rear wall 26, and nuts 34 are fastened to the bolts 33. The fastening secures the gas generator 30 to the case 24 together with the airbag 40.

The gas generator 30 may be attached to the case 24 using members other than the bolts 33 and the nuts 34. Alternatively, the inflator 31 may be directly attached to the case 24 without using the retainer 32.

As shown in FIG. 1, the side airbag apparatus includes an impact sensor 81 and a controller 82 in addition to the above described airbag module ABM. The impact sensor 81 is formed by an acceleration sensor and the like. The impact sensor 81 is provided on the body side portion 11 of the automobile 10 to detect an impact applied from the outside to the body side portion 11. The controller 82 controls activation of the inflator 31 based on a detection signal from the impact sensor 81.

Furthermore, the automobile 10 is equipped with a seat belt apparatus for restraining the occupant P seated in the automobile seat 12. However, illustration of the seat belt apparatus is omitted in FIGS. 1 and 2.

Operation and advantages of the side airbag apparatus according to the present embodiment, which is configured as described above, will now be described.

When the impact sensor 81 does not detect any impact from the side of the body side portion 11, the controller 82 of the side airbag apparatus does not output to the inflator 31 an activation signal for activating the inflator 31. The inflator 31 thus does not discharge inflation gas. The airbag body 41 remains accommodated in the storage portion 28 in the storage form (refer to FIG. 3).

In contrast, when the impact sensor 81 detects that an impact of a magnitude greater than or equal to a predetermined value has been applied to the body side portion 11 due to a side collision or the like while the automobile 10 is traveling, the controller 82, based on the detection signal, outputs an activation signal for activating the inflator 31 to the inflator 31. In response to the activation signal, the inflator 31 discharges inflating gas through the gas outlet 31*a*.

The inflation gas causes the internal pressure of the airbag body 41 to start to rise, and the airbag body 41 starts inflating. The airbag body 41 is unfolded and inflated while being deployed. The airbag body 41, which is deployed and inflated in the above described manner, pushes the garnish 15 forward, so that the garnish 15 is broken at the breakable portion 23 of a lower strength shown in FIG. 3. The airbag body 41 is projected forward from the garnish 15 through the broken section while part of the airbag body 41, more specifically the part in the vicinity of the gas generator 30, is remaining in the case 24.

The airbag body 41, which continues being supplied with inflation gas, is deployed while being unfolded forward between the body side portion 11 and the upper body of the occupant P seated in the automobile seat 12 as indicated by long dashed double-short dashed lines in FIGS. 1 and 2. The airbag body 41 thus restrains the upper body of the occupant P. The side impact transmitted through the body side portion 11 is reduced by the airbag body 41, and the upper body of the occupant P is protected. At this time, the reinforcing fabric sheets 51, 55 protect the airbag body 41 from the heat and pressure of the inflation gas.

As the airbag body 41 is deployed and inflated, the inflated-dimension limiters 70, that is, the limiter pieces 71, are pulled in the front-rear direction to be tensioned in the front-rear direction as shown in FIG. 8. As described above, the front-rear lengths LH1, LH2 satisfy the expression LH1<LH2 (see FIG. 7). Moreover, the rear end 71*r* of each limiter piece 71 is joined to the corresponding main body fabric portion 43, 44 at a section of the airbag body 41 close to the section (the bolt holes 66) fixed to the automobile 10 (the case 24). In other words, the rear ends 71*r* of the limiter pieces 71 are fixed to the automobile 10 via the rear sections of the main body fabric portions 43, 44, the reinforcing fabric sheets 51, 55, and the gas generator 30. On the other hand, the front end 71*f* of each limiter piece 71 is joined to the front end of the corresponding main body fabric portion 43, 44 by the front joint portion 75, which is provided at a position spaced away forward from the above-mentioned fixing portion of the airbag body 41 (the bolt holes 66).

Therefore, the limiter pieces 71 are entirely allowed to be tensioned unlike the case in which the limiter pieces 71 partially cannot be tensioned because the uppermost ends of the rear joint portions 72 of the inflated-dimension limiters 70 are above the sections of the airbag body 41 fixed to the automobile 10, or the lowermost ends are below the fixed sections (the airbag apparatus of Japanese National Phase Laid-Open Patent Publication 2007-510581 corresponds to this case). Then, the forward deployment and inflation of the airbag body 41 is restricted by the two limiter pieces 71 (the two inflated-dimension limiters 70), which are each tensioned as a whole. This limits the inflated dimension of the airbag body 41 in the front-rear direction.

The front end of the airbag body 41 when deployed and inflated is positioned more rearward than in the case without the inflated-dimension limiters 70. Therefore, even if there is an obstacle in front of the sections of the airbag body 41 fixed to the automobile 10, for example, on the seat cushion 13 in front of the garnish 15, the airbag body 41 is prevented from strongly pushing the obstacle when deployed and inflated.

In the main body fabric portions 43, 44, the portions between the sections to which the front ends 71*f* of the limiter pieces 71 are joined by the front joint portions 75 and the sections to which the rear ends 71*r* are joined by the rear joint portions 72 act to be inflated in the automobile width direction. Therefore, the airbag body 41, particularly the intermediate portion in the up-down direction, is inflated greatly in the automobile width direction as compared with the case without the inflated-dimension limiters 70. As a result, the amount of impact energy absorbed by the airbag body 41 is increased, and the performance of restraining and protecting the upper body of the occupant P from impact is enhanced.

Increase in the volume of the airbag body 41 can also increase the inflated dimension T1 in the automobile width direction to improve the performance of protecting the upper body of the occupant P. In this case, a large sized airbag body 41 would be required. Also, a large sized inflator 31, which discharges a greater amount of inflation gas, would be required. This would increase the weight of the airbag module ABM, which is not desirable in reduction of the weight of the automobile.

In contrast, the present embodiment increases the inflated dimension T1 in the automobile width direction only by adding the inflated-dimension limiters 70 without changing the volume of the airbag body 41. Therefore, it is not necessary to use a large airbag body 41 or use a large-sized inflator 31, and the performance of protecting the occupant P is improved without significantly increasing the weight of the airbag module ABM.

In addition, as described above, the inflated dimension T1 in the automobile width direction is increased in a portion of the airbag body 41 between the front joint portions 75 and the rear joint portions 72. In this regard, the dimension Lf of the front joint portions 75 is greater than the dimension Lr of the rear joint portions 72 (Lr<Lf) as shown in FIG. 4 in the present embodiment. Therefore, the inflated dimension T1 (see FIG. 8) of the airbag body 41 increases in a region larger upward and downward than in the case in which the dimension Lf is set to be equal to the smaller dimension Lr. This enlarges upward and downward the region in the upper body of the occupant P that is restrained by the airbag body 41 and protected from the impact.

Particularly, since the shoulder region PS of the upper body of the occupant P has a higher impact resistance than other regions, for example, than the thorax region PT, it is desirable that the inflated dimension T1 of the airbag body 41 in the automobile width direction be increased to restrain and protect the shoulder region PS. In this regard, in the present embodiment, the uppermost end (the upper horizontal front joint portion 77) of the front joint portion 75 is located above the uppermost end (the upper horizontal rear joint portion 74) of the rear joint portion 72 in the direction along the axis L1 of the inflator 31, and is close to the front upper ends A of the main body fabric portions 43, 44 of the airbag body 41. As described above, the front upper ends A are located in the vicinity of the side of the shoulder region PS when the airbag body 41 is deployed and inflated. Therefore, in the present embodiment, it is possible to inflate a portion of the airbag body 41 beside the shoulder region PS by a great amount in the automobile width direction. This improves the performance of restraining and protecting the shoulder region PS from impact compared to conventional side airbag apparatuses.

Further, since the airbag body 41 is formed by joining the peripheries of the main body fabric portions 43, 44 to each other, supply of inflation gas generally inflates the airbag body 41 into a curved surface shape.

However, as shown in FIG. 9A, in the airbag body 41 and the reinforcing fabric sheets 51, 55, the surface stiffness of the region Zr between the rear joint portions 72 is increased by the rear joint portions 72 to be higher than the surface stiffness of at least the region about the region Zr. This feature is realized by employing a configuration in which the rear joint portion 72 of each limiter piece 71 (each inflated-dimension limiter 70) includes the vertical rear joint portion 73 and the two horizontal rear joint portions 74. That is, in each rear joint portion 72, the stiffness in the direction orthogonal to the vertical rear joint portion 73 is increased, and the stiffness in the direction orthogonal to the horizontal rear joint portions 74 is increased. The stiffness of each rear joint portion 72 is higher than in the case in which it is constituted only by the vertical rear joint portion 73. Accordingly, in the airbag body 41 and the reinforcing fabric sheets 51, 55, the surface stiffness of the region Zr between the rear joint portions 72 is increased to be higher than the surface stiffness of the region about the region Zr, so that the region Zr acts to assume a state close to a flat plane. Opposite side sections of the region Zr in the automobile width direction are located at positions further away from each other in the automobile width direction than in the case of a curved surface. Accordingly, the portion of the airbag body 41 between the rear joint portions 72 and the front joint portions 75 is inflated by a greater amount in the automobile width direction, and the inflated dimension T1 in the automobile width direction increases.

Further, the above-described action of increasing the inflated dimension T1 of the rear joint portions 72 extends to the reinforcing fabric sheets 51, 55 joined to the airbag body 41. The dimension in the up-down direction of the reinforcing fabric sheet 51 is greater than the dimension Lr of the rear joint portions 72. Thus, the above-described action also extends to the sections of the reinforcing fabric sheet 51 above and below the rear joint portions 72. This expands upward and downward the region in which the inflated dimension T1 increases in the automobile width direction.

In addition, as shown in FIG. 9B, the surface stiffness of the region Zf of the airbag body 41 between the front joint portions 75 is increased by the front joint portions 75 to be higher than the surface stiffness of at least the region about the region Zf. This feature is realized by employing a configuration in which the front joint portion 75 of each limiter piece 71 (each inflated-dimension limiter 70) includes the vertical front joint portion 76 and the two horizontal front joint portions 77. That is, in each front joint portion 75, the stiffness in the direction orthogonal to the vertical front joint portion 76 is increased, and the stiffness in the direction orthogonal to the horizontal front joint portions 77 is increased. The stiffness of each front joint portion 75 is higher than in the case in which it is constituted only by the vertical front joint portion 76. Accordingly, the surface stiffness of the region Zf is increased to be higher than the surface stiffness of the region about the region Zf, so that the region Zf acts to assume a state close to a flat plane. Opposite side sections of the region Zf in the automobile width direction are located at positions further away from each other in the automobile width direction than in the case of a curved surface. In this respect also, the portion of the airbag body 41 between the rear joint portions 72 and the front joint portions 75 is inflated by a greater amount in the automobile width direction, and the inflated dimension T1 in the automobile width direction increases.

In addition, since the inflated-dimension limiter 70 is provided for each of the main body fabric portions 43, 44, the inflated dimension T1 of the airbag body 41 in the automobile width direction is increased toward the opposite sides in the automobile width direction. Therefore, the airbag body 41 is inflated more in the automobile width direction than in the case in which the inflated-dimension limiter 70 is provided only on one of the main body fabric portions 43, 44. It is thus possible to further increase the inflated dimension T1 of the airbag body 41 in the automobile width direction.

By increasing the inflated dimension T1 as described above, it is possible to further increase the amount of impact energy absorbed by the airbag body 41, thereby restraining the upper body of the occupant P and improving the performance of protecting the upper body from the impact.

In the present embodiment, the airbag body 41 is fixed to the automobile 10 (vehicle) at the rear end. The rear end 71r of each limiter piece 71 is joined, by the rear joint portion 72, to the airbag body 41 at a section in the vicinity of the section of the airbag body 41 that is fixed to the automobile 10.

Thus, the limiter pieces 71 are tensioned as the airbag body 41 is inflated and deployed. The rear end 71r of each limiter piece 71 is joined, by the rear joint portion 72, to the airbag body 41 at a section in the vicinity of the section of the airbag body 41 that is fixed to the automobile 10. In other words, the rear end 71r of the limiter piece 71 is fixed to the automobile 10 via the rear end of the airbag body 41. In contrast, the front end 71f of each limiter piece 71 is joined, by the front joint portion 75, to the airbag body 41 at a section separated forward from the section of the airbag body 41 that is fixed to the automobile 10. Therefore, the limiter pieces 71 are entirely allowed to be tensioned unlike the case in which the limiter pieces 71 partially cannot be tensioned because the uppermost ends of the rear joint portions 72 are above the section of the airbag body 41 fixed to the automobile 10, or the lowermost ends of the rear joint portions 72 are below that fixed section. Then, the forward deployment and inflation of the airbag body 41 is restricted by the limiter pieces 71, which are each tensioned as a whole.

Further, the inflator 31 is elongated and arranged to extend in the up-down direction at the rear end of the airbag body 41. The inflator 31 is attached to the automobile 10 together with the rear end of the airbag body 41. The uppermost ends of the front joint portions 75 are located above the uppermost ends of the rear joint portions 72 in the direction along the axis of the inflator 31. The lowermost ends of the front joint portions 75 are located below the lowermost ends of the rear joint portions 72 in the direction along the axis of the inflator 31.

The dimension between the uppermost end and the lowermost end of the front joint portion 75 of each inflated-dimension limiter 70 can be made greater than the dimension between the uppermost end and the lowermost end of the rear joint portion 72.

The above-described embodiment may be modified as follows.

<Regarding Inflated-Dimension Limiter 70>

The number of the inflated-dimension limiters 70 may be changed to one. In this case, the inflated-dimension limiter 70 may be configured to bridge two sections of only one of the main body fabric portions 43, 44. Further, the inflated-dimension limiter 70 may bridge the main body fabric portions 43, 44. In this case, the front end of the inflated-dimension limiter 70 is joined to one of the main body fabric portions 43, 44 by a front joint portion, and the rear end of the inflated-dimension limiter 70 is joined to the other one of the main body fabric portions 43, 44 by a rear joint portion at a section behind the position of the main body fabric portion to which the front end of the inflated-dimension limiter 70 is joined by the front joint portion.

Each inflated-dimension limiter 70 may be constituted by a plurality of limiter pieces arranged in the up-down direction.

FIG. 10 illustrates a modification in which each of a pair of inflated-dimension limiters 70 is constituted by a pair of upper and lower band-shaped limiter pieces 91, 92. FIG. 10 shows the airbag body 41 in a flatly spread state. The limiter pieces 91, 92 are joined to the airbag body 41 and the reinforcing fabric sheets 51, 55 by the rear end joint portions 94, 95. Although the front end of each of the limiter pieces 91, 92 is configured to be joined to the airbag body 41 by the front end joint portion 93, FIG. 10 illustrates a state in which the front ends of the limiter pieces 91, 92 are yet to be joined to the airbag body 41.

In this case, the upper limiter piece 91 of each inflated-dimension limiter 70 is arranged to be inclined to become higher as the distance from the folding lines 52, 56 increases. The lower limiter piece 92 is arranged to be inclined to become lower as the distance from the folding lines 52, 56 increases.

The limiter pieces 91, 92 are joined to the main body fabric portions 43, 44 of the airbag body 41 by the front end joint portions 93. Each upper limiter piece 91 is joined to the airbag body 41 and the reinforcing fabric sheet 51 by the rear end joint portion 94, which is provided at a position close to the section of the airbag body 41 that is fixed to the automobile 10 (the upper bolt hole 66). Each lower limiter piece 92 is joined to the airbag body 41 and the reinforcing fabric sheets 51, 55 by the rear end joint portion 95, which is provided at a position close to the section of the airbag body 41 that is fixed to the automobile 10 (the lower bolt hole 66).

In this case, the front joint portion of each inflated-dimension limiter 70 is constituted by the two front end joint portions 93 provided in the two limiter pieces 91, 92. Also, the rear joint portion of each inflated-dimension limiter 70 is constituted by the rear end joint portions 94, 95 provided in the two limiter pieces 91, 92. Since the limiter pieces 91, 92 are arranged in the inclined states as described above, the dimension Lf between the uppermost end and the lowermost end of the front end joint portions 93 of the two limiter pieces 91, 92 is set to be greater than the dimension Lr between the uppermost end of the rear end joint portion 94 and the lowermost end of the rear end joint portion 95. That is, the dimension Lf between the uppermost end and the lowermost end at the front joint portion of the inflated-dimension limiter 70 is set to be greater than the dimension Lr between the uppermost end and the lowermost end at the rear joint portion of the inflated-dimension limiter 70. Therefore, this modification achieves the same operations and advantages as the above-illustrated embodiment.

Each inflated-dimension limiter 70 may be constituted by three or more limiter pieces arranged in the up-down direction. Even in this case, however, the limiter pieces are arranged such that the dimension Lf between the uppermost end and the lowermost end of the front end joint portions of the limiting pieces is set to be greater than the dimension Lr between the uppermost end and lowermost end of all the rear end joint portions. That is, the limiter pieces are arranged such that the dimension Lf between the uppermost end and the lowermost end at the front joint portion of the inflated-dimension limiter 70 is greater than the dimension Lr between the uppermost end and the lowermost end at the rear joint portion.

At least one of the positions of the uppermost end and the lowermost end of the front joint portion 75 of each inflated-dimension limiter 70 may be changed as long as the dimension Lf between the uppermost end and the lowermost end of the front joint portion 75 is greater than the dimension Lr between the uppermost end and the lowermost end of the rear joint portion 72. When each inflated-dimension limiter 70 is constituted by a pair of limiter pieces 91, 92, at least one of the position of the upper front end joint portion 93, which corresponds to the uppermost end of the front joint portion of each inflated-dimension limiter 70, and the position of the lower front end joint portion that corresponds to the lowermost end of the front joint portion may be changed as long as the dimension Lf between the uppermost end and the lowermost end of the front end joint portions 93 of the two limiter pieces 91, 92 is greater than the dimension Lr between the uppermost end and the lowermost end of the rear end joint portions 94, 95 of the two limiter pieces 91, 92. That is, at least one of the position of the upper front end joint portion 93 and the position of the lower front end joint portion 93 may be changed as long as the dimension Lf between the uppermost end and the lowermost end at the front joint portion of each inflated-dimension limiter 70 is greater than the dimension Lr between the uppermost end and the lowermost end at the rear joint portion of the inflated-dimension limiter 70.

For example, the uppermost end of the front joint portion 75 (the upper horizontal front joint portion 77) in the above-described embodiment may be located at the same position as the uppermost end of the rear joint portion 72 (the upper horizontal rear joint portion 74) in the direction along the axis L1 of the inflator 31. In this case, the lowermost end of the front joint portion 75 (the lower horizontal front joint portion 77) is located below the lowermost end (the lower horizontal rear joint portion 74) of the rear joint portion 72 in the direction along the axis L1.

In contrast to the above described case, the lowermost end of the front joint portion 75 (the lower horizontal front joint portion 77) may be located at the same position as the lowermost end of the rear joint portion 72 (the lower horizontal rear joint portion 74) in the direction along the axis L1 of the inflator 31. In this case, the uppermost end of the front joint portion 75 (the upper horizontal front joint portion 77) is located above the uppermost end (the upper horizontal rear joint portion 74) of the rear joint portion 72 in the direction along the axis L1.

The dimension Lf between the uppermost end and the lowermost end at the front joint portion 75 of each inflated-dimension limiter 70 may be smaller than the dimension Lr between the uppermost end and the lowermost end at the rear joint portion 72. In a case in which each inflated-dimension limiter 70 is constituted by two limiter pieces 91, 92, the dimension Lf between the uppermost end and the lowermost end at the front end joint portions 93 of the two limiter pieces 91, 92 may be smaller than the dimension Lr between the uppermost end and the lowermost end of the rear end joint portions 94, 95 of the two limiter pieces 91, 92. That is, the dimension Lf between the uppermost end and the lowermost end at the front joint portion of each inflated-dimension limiter 70 may be set to be smaller than the dimension Lr between the uppermost end and the lowermost end at the rear joint portion of the inflated-dimension limiter 70.

In this case, it is possible to enlarge the region where the inflated dimension of the airbag body 41 is increased in the automobile width direction, compared with the case in which the dimension Lr is set to be equal to the smaller dimension Lf. This enlarges the region in the upper body of the occupant P that is restrained by the airbag body 41 and protected from the impact, thereby improving the performance of restraining the occupant P.

Among the limiter pieces 71, the reinforcing fabric sheets 51, 55, and the airbag body 41, any two that are adjacent to each other in the front-rear direction may be joined to each other by bonding in the rear region Zr in addition to by sewing at the rear joint portion 72. Also, among the limiter pieces 71, the reinforcing fabric sheets 51, 55, and the airbag body 41, any two that are adjacent to each other in the front-rear direction may be joined to each other by sewing in the region Zr in addition to by sewing at the rear joint portion 72. These modifications further improve the surface stiffness of the region Zr. Such modifications may be applied to the front region Zf.

In the above-illustrated embodiment, the rear joint portion 72 may be constituted only by the vertical rear joint portion 73. Further, the front joint portion 75 may be constituted only by the vertical front joint portion 76.

The section of the limiter piece 71 of each inflated-dimension limiter 70 that is joined to the airbag body 41 by the front joint portion 75 may be located at a position displaced in the front-rear direction from that in the above-illustrated embodiment. For example, the section may be displaced rearward from that in the above-illustrated embodiment. Also, the section of the limiter piece 71 that is joined to the airbag body 41 by the rear joint portion 72 may be located at a position displaced in the front-rear direction from that in the above-illustrated embodiment. For example, the section may be displaced forward from that in the above-illustrated embodiment. In either case, the section of the limiter piece 71 that is joined to the airbag body 41 by the rear joint portion 72 is set to be behind the section of the limiter piece 71 that is joined to the airbag body 41 by the front joint portion 75.

<Other Modifications>

At least one of the reinforcing fabric sheets 51, 55 may be omitted.

Substantially the entire airbag body 41 may be configured to be inflated as in the above-illustrated embodiment, but may also partially include a non-inflation portion, which is neither supplied with inflation gas nor inflated.

In place of the storage portion 28 in the garnish 15, a storage portion may be provided in part on the outer side of the seat back 14 or in the body side portion 11, and the airbag module ABM may be installed in the storage portion.

The present invention may be applied to any type of side airbag apparatus that is designed to protect a region different from the region to be protected in the above-illustrated embodiment (the region ranging from the shoulder region PS to the thorax region PT) as long as the apparatus is designed to protect the upper body of the occupant P (the region ranging from the head to the lumbar region).

The side airbag apparatus can be applied not only to a rear seat, but also to a front seat. In this case, the body side portion corresponding to the front seat includes a front door and a center pillar (B-pillar).

The present invention may be applied to a side airbag apparatus of an automobile in which a seat is arranged such that the seat back faces in a direction other than the forward direction, for example, sideways. In this case, when an impact is applied to a side of the automobile seat (in the front-rear direction of the automobile), the side airbag apparatus protects the occupant from the impact.

Automobiles to which the side airbag apparatus according to the present invention is applied include various industrial vehicles in addition to private cars.

The present invention can be applied to side airbag apparatuses that are mounted on vehicles other than automobiles, for example, airplanes, boats, and ships and protect occupants seated in vehicle seats from impacts.

The invention claimed is:
1. A side airbag apparatus comprising:
an inflator;
an airbag body that is configured to be deployed and inflated by inflation gas supplied from the inflator beside an upper body of an occupant seated in a vehicle seat arranged in a vehicle; and an inflated-dimension limiter arranged inside the airbag body, wherein the inflated-dimension limiter is joined to the airbag body by a front joint portion provided at a front part of the inflated-dimension limiter, the inflated-dimension limiter is further joined, by a rear joint portion provided at a rear part of the inflated-dimension limiter, to a portion of the airbag body that is behind the front joint portion, the side airbag apparatus is configured to cause the inflated-dimension limiter to be tensioned as the airbag body is inflated to limit an inflated dimension of the airbag body in a front-rear direction, thereby increasing inflation of the airbag body in a width direction of the vehicle seat, and a dimension between an uppermost end and a lowermost end of the front joint portion is set to be different from a dimension between an uppermost end and a lowermost end of the rear joint portion.

2. The side airbag apparatus according to claim 1, wherein the airbag body includes two main body fabric portions superposed on each other in the width direction of the vehicle seat and is formed by joining peripheries of the main body fabric portions to each other, and the inflated-dimension limiter is one of two inflated-dimension limiters each provided for one of the main body fabric portions.

3. The side airbag apparatus according to claim 2, wherein a reinforcing fabric sheet, which extends in an up-down direction, is arranged at a rear end of the airbag body while being superposed on the rear end and joined to the airbag body, the reinforcing fabric sheet includes two reinforcing fabric portions that are arranged in the width direction of the vehicle seat and has a dimension in the up-down direction greater than the dimension between the uppermost end and the lowermost end of the rear joint portion, each inflated-dimension limiter is constituted by a single limiter piece, the front joint portion is provided at a front end of each limiter piece, the rear joint portion is provided at a rear end of each limiter piece, and the rear joint portion of each limiter piece joins the rear end of the limiter piece to the corresponding one of the main body fabric portions and the corresponding one of the reinforcing fabric portions in such a shape that, in the airbag main body and the reinforcing fabric sheet, a surface stiffness of a region between the rear joint portion of the limiter piece and the rear joint portion of the other limiter piece is higher at least than a surface stiffness about the region.

4. The side airbag apparatus according to claim 3, wherein each rear joint portion includes a vertical rear joint portion extending in the up-down direction and two horizontal rear joint portions extending from upper and lower ends of the vertical rear joint portion toward the other rear joint portion.

5. The side airbag apparatus according to claim 3, wherein the airbag body is fixed to the vehicle at the rear end of the airbag body, and the rear end of each limiter piece is joined to the airbag body by the rear joint portion at a section of the airbag body in the vicinity of the section fixed to the vehicle.

6. The side airbag apparatus according to claim 5, wherein the inflator has an elongated shape, the inflator is arranged to extend in the up-down direction at the rear end inside the airbag body and is attached to the vehicle together with the rear end of the airbag body, and the uppermost end of the front joint portion provided in each limiter piece is located above the uppermost end of the rear joint portion provided in the limiter piece in a direction along an axis of the inflator.

7. The side airbag apparatus according to claim 5, wherein the inflator has an elongated shape, the inflator is arranged to extend in the up-down direction at the rear end inside the airbag body and is attached to the vehicle together with the rear end of the airbag body, and the lowermost end of the front joint portion provided in each limiter piece is located below the lowermost end of the rear joint portion provided in the limiter piece in a direction along an axis of the inflator.

8. The side airbag apparatus according to claim 1, wherein the inflated-dimension limiter is constituted by a plurality of limiter pieces arranged in an up-down direction, the front joint portion of the inflated-dimension limiter is constituted by a plurality of front end joint portions provided in each limiter piece, the rear joint portion of the inflated-dimension limiter is constituted by a plurality of rear end joint portions provided in each limiter piece, and a dimension between an uppermost end and a lowermost end of the front end joint portions is set to be different from a dimension between an uppermost end and a lowermost end of the rear end joint portions.

9. The side airbag apparatus according to claim 1, wherein the front joint portion is provided at a front end of the inflated-dimension limiter, and the rear joint portion is provided at a rear end of the inflated-dimension limiter.

* * * * *